United States Patent
Ozaki et al.

(10) Patent No.: US 8,682,261 B2
(45) Date of Patent: Mar. 25, 2014

(54) ANTENNA SHARING FOR WIRELESSLY POWERED DEVICES

(75) Inventors: Ernest T. Ozaki, Poway, CA (US); Stanley S. Toncich, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 554 days.

(21) Appl. No.: 12/695,901

(22) Filed: Jan. 28, 2010

(65) Prior Publication Data

US 2010/0222010 A1 Sep. 2, 2010

Related U.S. Application Data

(60) Provisional application No. 61/152,537, filed on Feb. 13, 2009.

(51) Int. Cl.
*H04B 1/46* (2006.01)
(52) U.S. Cl.
USPC .......................................... 455/82; 455/575.7
(58) Field of Classification Search
USPC ............. 455/101, 73, 552.1, 104, 575.7, 129, 455/562.1, 343.1; 340/10.1
See application file for complete search history.

(56) References Cited

U.S. PATENT DOCUMENTS

| | | | |
|---|---|---|---|
| 7,366,480 B2 * | 4/2008 | Amano | 455/101 |
| 2005/0085196 A1 * | 4/2005 | Amano | 455/101 |
| 2006/0281435 A1 * | 12/2006 | Shearer et al. | 455/343.1 |
| 2008/0055047 A1 * | 3/2008 | Osada et al. | 340/10.1 |
| 2008/0233890 A1 * | 9/2008 | Baker | 455/73 |
| 2009/0001930 A1 | 1/2009 | Pohjonen | |
| 2009/0041241 A1 | 2/2009 | Dobyns et al. | |
| 2009/0233642 A1 * | 9/2009 | Zhitnitsky | 455/552.1 |

FOREIGN PATENT DOCUMENTS

| | | |
|---|---|---|
| CN | 101194219 A | 6/2008 |
| GB | 2429372 | 2/2007 |
| JP | 7154288 A | 6/1995 |
| JP | 2001307032 A | 11/2001 |
| JP | 2003069335 A | 3/2003 |
| WO | WO2006133204 | 12/2006 |
| WO | WO2007003978 | 1/2007 |
| WO | 2009003707 A1 | 1/2009 |

OTHER PUBLICATIONS

International Search Report and Written Opinion -PCT/US2010/024150—International Search Authority, European Patent Office,Jan. 19, 2011.

* cited by examiner

*Primary Examiner* — April G Gonzales
(74) *Attorney, Agent, or Firm* — Knobbe, Martens, Olson & Bear, LLP

(57) ABSTRACT

Exemplary embodiments include an antenna for receiving electromagnetic radiation in a broadcast radiation band and a near-field radiation band to generate a Radio Frequency (RF) signal. A coupling element couples the RF signal to a first port and at least one additional port, which may be a second port and a third port. A wireless power receiver on the first port includes a rectifier for converting the RF signal to a DC signal when the antenna couples to radiation in the near-field radiation band in a coupling-mode region of the antenna. A near-field communication transceiver includes circuitry for communicating information on the antenna in the near-field radiation band when the coupling element couples the second port to the RF signal. A broadcast receiver on the third port includes circuitry for receiving and tuning the broadcast radiation band when the coupling element couples the third port to the RF signal.

38 Claims, 5 Drawing Sheets

US 8,682,261 B2

ANTENNA SHARING FOR WIRELESSLY POWERED DEVICES

CLAIM OF PRIORITY UNDER 35 U.S.C. §119

This application claims priority under 35 U.S.C. §119(e) to U.S. Provisional Patent Application 61/152,537 entitled "ANTENNA SHARING FOR WIRELESSLY POWERED DEVICES" filed on Feb. 13, 2009.

BACKGROUND

1. Field

The present invention relates generally to wireless power transfer, and more specifically to devices, systems, and methods related to adaptively tuning impedance in a receiver device to improve wireless power transfer.

2. Background

Typically, each battery powered device such as a wireless electronic device requires its own charger and power source, which is usually an alternating current (AC) power outlet. Such a wired configuration becomes unwieldy when many devices need charging.

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. The receive antenna collects the radiated power and rectifies it for charging the battery. Antennas are generally of resonant length in order to improve the coupling efficiency. This approach suffers from the fact that the power coupling falls off quickly with distance between the antennas, so charging over reasonable distances (e.g., less than 1 to 2 meters) becomes difficult. Additionally, since the transmitting system radiates plane waves, unintentional radiation can interfere with other systems if not properly controlled through filtering.

Other approaches to wireless energy transmission techniques are based on inductive coupling between a transmit antenna embedded, for example, in a "charging" mat or surface and a receive antenna (plus a rectifying circuit) embedded in the electronic device to be charged. This approach has the disadvantage that the spacing between transmit and receive antennas must be very close (e.g., within millimeters). Though this approach does have the capability to simultaneously charge multiple devices in the same area, this area is typically very small and requires the user to accurately locate the devices to a specific area.

In addition to wireless energy transmission, electronic devices often use a number of different communication channels at various frequencies. Often, a device may need to include an antenna for each different frequency band, which can become expensive both in terms of space used on the device and cost of the various components to support the multiple antennas.

There is a need to reduce the number of antennas that may be required on a device for various functions, such as wireless power reception, near-field communication (NFC), and other communication functions that an electronic device may perform

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
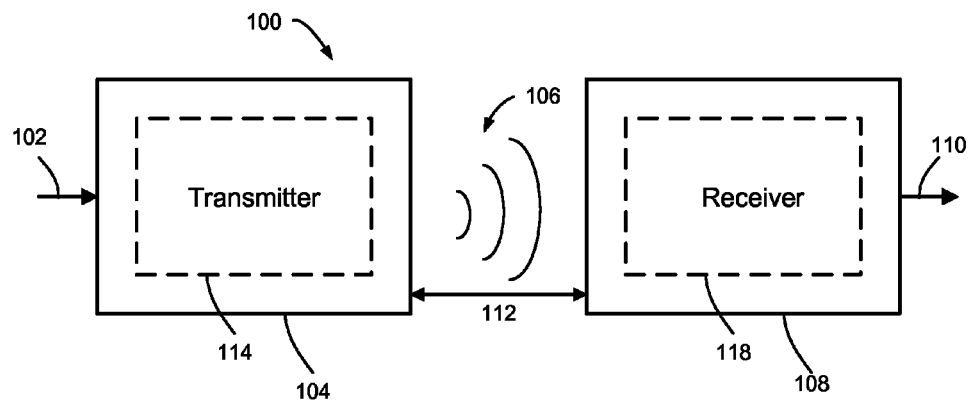
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106 (also referred to herein as near field radiation).

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
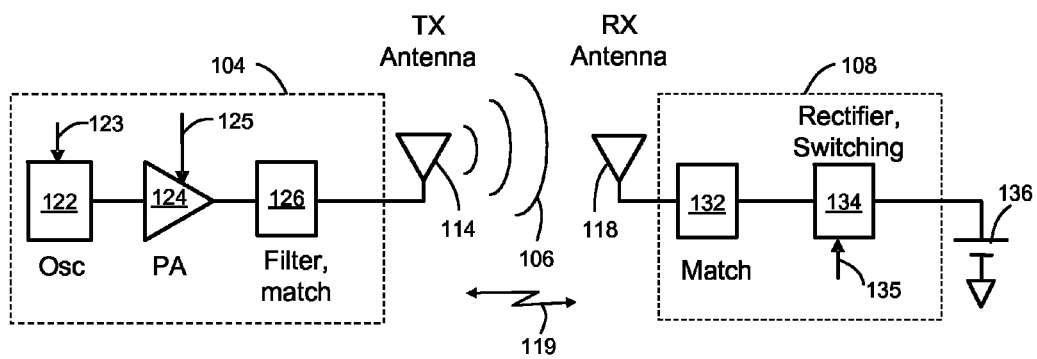
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
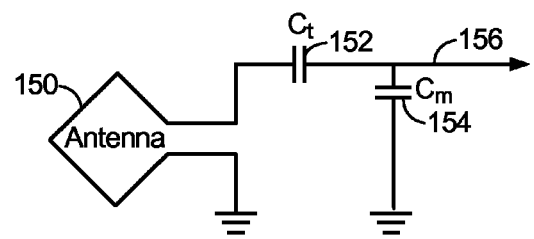
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small receive antenna at significantly larger distances than allowed by far field and inductive approaches mentioned earlier. If the transmit antenna is sized correctly, high coupling levels (e.g., −1 to −4 dB) can be achieved when the receive antenna on a host device is placed within a coupling-mode region (i.e., in the near-field) of the driven transmit loop antenna.

Figure 4:
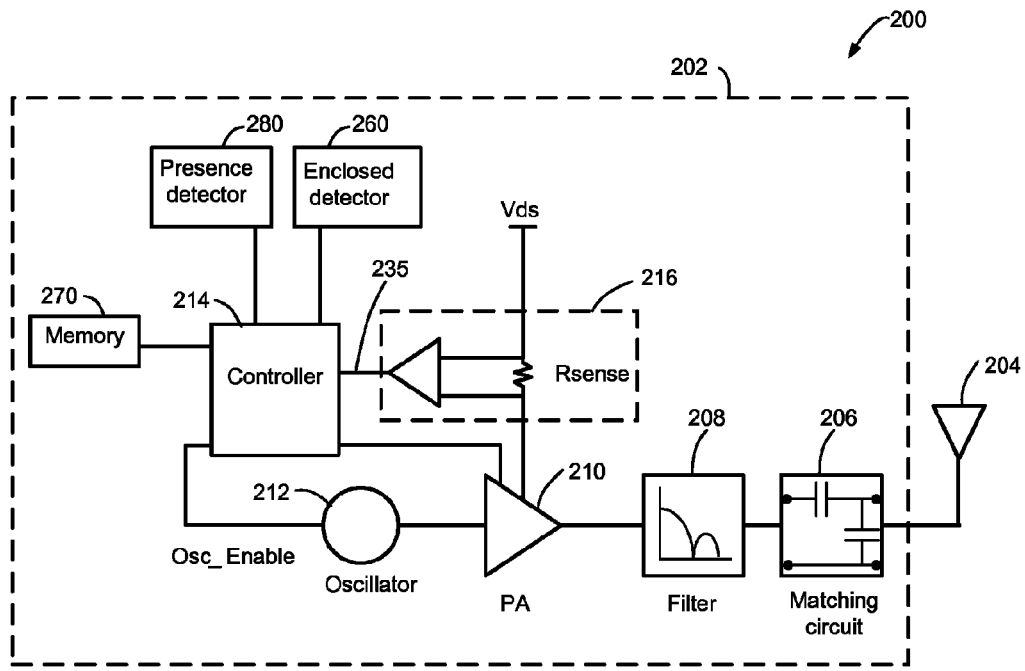
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides Radio Frequency (RF) power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212 (also referred to herein as a signal generator). The transmit circuitry may be comprised of discrete devices or circuits, or alternately, may be comprised of an integrated assembly. An exemplary RF power output from transmit antenna 204 may be on the order of 2.5 to 8.0 Watts.

Transmit circuitry 202 further includes a controller 214 for enabling the oscillator 212 during transmit phases (or duty cycles) for specific receivers, for adjusting the frequency of the oscillator, for adjusting the output power level, for implementing a communication protocol for interacting with neighboring devices through their attached receivers. The controller 214 is also for determining impedance changes at the transmit antenna 204 due to changes in the coupling-mode region due to receivers placed therein.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the receiver device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
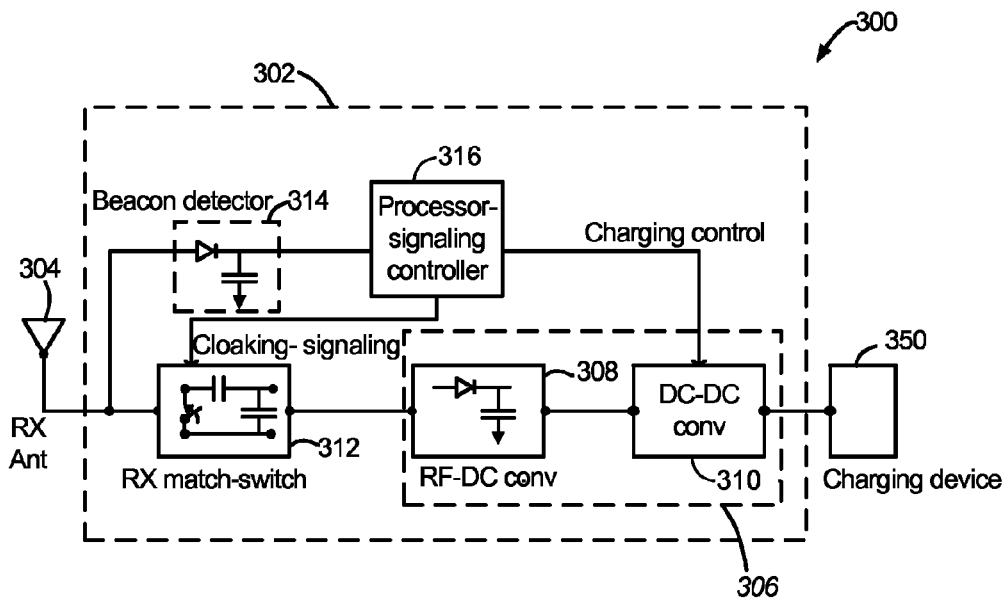
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

The receive antenna 304 is tuned to resonate at the same frequency, or near the same frequency, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2), which can be used to "cloak" the receiver from the transmitter.

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking" Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter uses on/off keying of the transmitted signal to adjust whether energy is available in the near-field. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

In some exemplary embodiments, the receive circuitry 320 may signal a power requirement to a transmitter in the form of, for example, desired power level, maximum power level, desired current level, maximum current level, desired voltage level, and maximum voltage level. Based on these levels, and the actual amount of power received from the transmitter, the processor 316 may adjust the operation of the DC-DC-to-DC converter 310 to regulate its output in the form of adjusting the current level, adjusting the voltage level, or a combination thereof.

Exemplary embodiments of the present invention are directed to antennas and coupling elements for sharing a single antenna to service wireless power delivery, near-field communication and an FM frequency band, for each of which normally separate antennas would be used.

Figure 6:
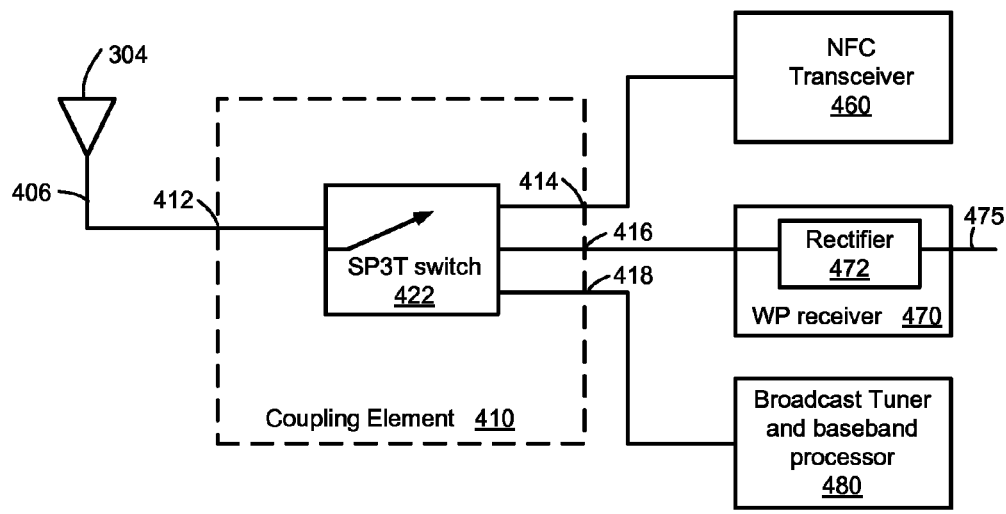
FIG. 6 is a simplified block diagram using a switch to share an antenna for wireless power reception, near-field communication, and reception of signals in a broadcast radiation band.

FIG. 6 is a simplified block diagram using a switch 422 to share an antenna 304 for wireless power reception, near-field communication, and reception of signals in a broadcast radiation band.

In the exemplary embodiments discussed herein, the antenna 304 is coupled to an RF signal 406, which is connected to a common port 412 of a coupling element 410. The coupling element 410 may include a number of different internal circuits for coupling the common port 412 to one or more of a first port 414, a second port 416, and a third port 418. As an illustration of possible coupling elements 410, different exemplary embodiments for the coupling element 410 are shown in each of FIGS. 6-10.

The first port 414 of the coupling element 410 is coupled to an NFC transceiver 460. As used herein, near field communication includes both NFC and Radio Frequency IDentification (RFID) communication frequencies and protocols.

NFC is a communication standard that enables wireless communication devices, such as cellular telephones, SmartPhones, and personal digital assistants (PDAs) to establish peer-to-peer (P2P) networks. NFC may enable electronic devices to exchange data and initiate applications automatically when they are brought in close proximity, for example ranges from less than a centimeter to a distance of about 20 cm.

As non-limiting examples, NFC may enable downloading of images stored in a digital camera to a personal computer, downloading of audio and video entertainment to portable devices, or downloading of data stored in a SmartPhone to a personal computer or other wireless device. NFC may be compatible with smart card technologies and may also be utilized to enable purchase of goods and services. In an exemplary embodiment, the frequency used for NFC is centered at about 13.56 MHz.

The NFC transceiver 460 may include circuitry to impedance match to the antenna 304 or other circuitry within the coupling element 410 as will be apparent from the coupling mechanisms discussed below. The NFC transceiver 460 may also include suitable logic, circuitry, processors, code, and combinations thereof to enable the reception and transmission of NFC signals, for which the carrier frequency of the received signal is in the NFC frequency band. Data may be modulated on the carrier frequency.

RFID applications and NFC applications may utilize a common RF band. RFID is an automatic identification method, relying on storing and remotely retrieving data using devices called RFID tags or transponders. An RFID tag is an object that can be attached to or incorporated into a product, animal, or person for the purpose of identification using radio waves. RFID tags generally include an integrated circuit for storing and processing information, modulating and demodulating an RF signal, and perhaps other specialized functions.

An RFID tag can automatically be read from several meters away and generally does not have to be in the line of sight of the reader. RFID tags come in three general varieties: passive, semi-passive (also known as battery-assisted), or active. Passive tags require no internal power source, whereas semi-passive and active tags generally include a power source, such as a small battery.

In passive RFID, the small electrical current induced in the antenna 304 by the incoming RF signal provides sufficient power for the integrated circuit in the tag to power up and transmit a response. Most passive tags signal by backscattering the carrier wave from the reader. Thus, a tag antenna element is configured to both collect power from the incoming signal, and to transmit the outbound backscatter signal. Passive tags currently have practical read distances ranging from about 10 cm up to a few meters.

Unlike passive RFID tags, active RFID tags have their own internal power source, which is used to power the integrated circuits, and broadcast a signal to the reader. Active tags may transmit at higher power levels than passive tags, allowing them to be more effective in "RF challenged" environments such as water, metal, or at greater distances. Many active tags have practical ranges of hundreds of meters, and a battery life of up to 10 years.

Semi-passive tags are similar to active tags in that they have their own power source, but the battery is generally used just to power the microchip and not broadcast a signal. In semi-passive tags, the RF energy is generally reflected back to the reader like a passive tag.

The second port 416 of the coupling element 410 is coupled to a wireless power receiver 470. For exemplary purposes, the wireless charging described may operate at 13.56 MHz frequency, the same frequency used for RFID and NFC. Frequency bands associated with NFC, RFID, and wireless power may be referred to herein as a near-field radiation band. However, it should be noted that exemplary embodiments are not limited to wireless power reception at 13.56 MHz, other frequencies can be used for this function. As shown in FIGS. 6-10 the wireless power receiver 470 includes a rectifier 472 for converting the RF signal 412 communicated through the coupling element 410 to a DC signal 475 suitable for use by a receiver device (not shown) to charge a battery, supply power to the receiver device, or a combination thereof. Of course, the wireless power receiver 470 may include many other elements such as those described above with respect to FIGS. 2 and 5.

The third port 418 of the coupling element 410 is coupled to a broadcast receiver 480. There are well established broadcast and communication services, which utilize the FM radiation band with carrier frequencies about 88 to 108 MHz and the AM radiation band with carrier frequencies of about 540 to 1600 KHz. The broadcast receiver 480 may include circuitry to impedance match to the antenna 304 or other circuitry within the coupling element 410 as will be apparent from the coupling mechanisms discussed below. The broadcast receiver 480 may also include suitable logic, circuitry, processors, code, and combinations thereof to enable the reception of FM signals or AM signals at various frequencies in the FM radiation band or the AM radiation band, respectively, and to demodulate such signals to a baseband including the information carried on a carrier frequency.

Thus, using the FM radiation band as an example, in some embodiments the broadcast receiver 480 may include tuning circuitry configured to impedance match and tune the antenna 304 to the FM radiation band and different tuning circuitry to select and tune to a specific carrier frequency in the FM radiation band. In other embodiments, the broadcast receiver may combine tuning functions to tune directly to a desired carrier frequency within the FM radiation band.

In some exemplary embodiments, the FM signals may be received via the antenna 304 simultaneously with the reception and transmission of NFC signals and wireless power reception.

In the exemplary embodiment described in conjunction with FIGS. 6-10, one antenna 304 is shared for three exemplary functions, such as FM radio reception, NFC and wireless power transfer, whereas normally three separate antennas are used, one for each function.

NFC requires a relatively larger bandwidth than does wireless power transfer, and is generally capable of both receive and transmit functions. Wireless power transfer generally operates at a fixed frequency and may be configured to receive RF power at a higher level than NFC. FM radio may be tuned to higher frequencies in the FM radio band, and meet a minimum sensitivity for normal operation. The FM signal may be receive only, and thus may be sensitive to signal overload.

In the exemplary embodiment of FIG. 6, the coupling element is configured as a single-pole-three-throw switch to selectively couple the common port 412 to one of the first port 414, the second port 416, or the third port 418. In this embodiment, the antenna 304 is directly connected to one of the NFC transceiver 460, the wireless power receiver 470, or the broadcast receiver 480. With the direct connection, the exemplary embodiment of FIG. 6 may include good conditions for impedance matching to the antenna 304 for each of the desired frequencies. The NFC path may provide a path which lowers the Q of the antenna 304, thus providing a wider bandwidth relative to wireless power reception. The wireless power path may provide an optimum impedance match with the lowest possible loss at one desired frequency. The broadcast path may provide an impedance match to resonate the antenna 304 over the FM radiation band or the AM radiation band and provide for the required sensitivity.

Figure 7:
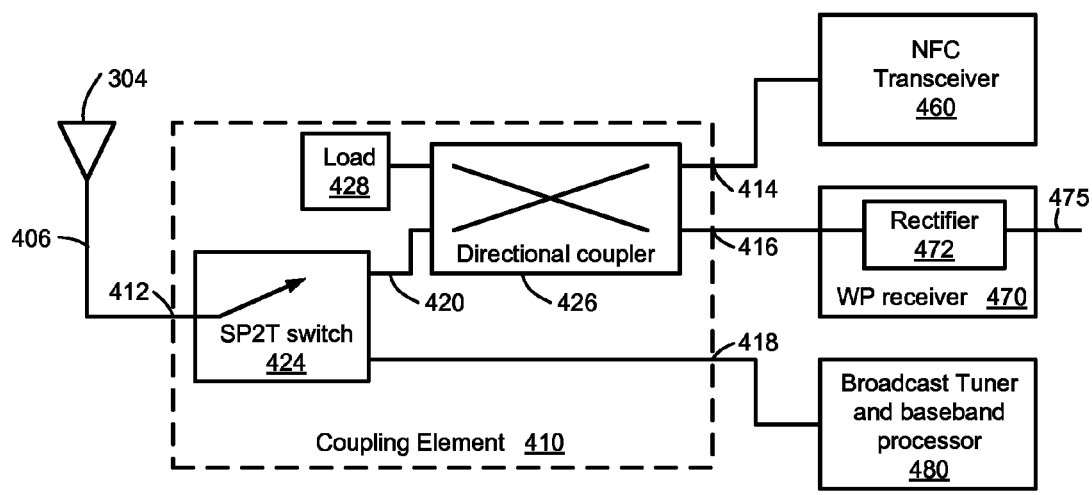
FIG. 7 is a simplified block diagram using a switch and a directional coupler to share an antenna for wireless power reception, near-field communication, and reception of signals in the broadcast radiation band.

FIG. 7 is a simplified block diagram using a switch 424 and a directional coupler 426 to share an antenna 304 for wireless power reception, near-field communication, and reception of signals in the broadcast radiation band. The elements of the antenna 304, the RF signal 406, the NFC transceiver 460, the wireless power receiver 470, the DC signal 475, and the broadcast receiver 480 are the same as those of FIG. 6 and need not be described again.

In FIG. 7, the coupling element 410 includes a single-pole-two-throw switch 424 coupling the RF signal 412 to the third port 418 and a near-field signal 420. A coupler 426 (e.g., a directional coupler) couples the near-field signal 420 to both the first port 414 and the second port 416. In this embodiment, the antenna 304 is directly connected to one of the broadcast receiver 480 or the near-field signal 420. With the direct connection, the exemplary embodiment of FIG. 7 may include good conditions for impedance matching to the antenna 304 for each of the desired frequencies of the broadcast radiation band and the near-field radiation band.

In an exemplary embodiment, the coupler 426 may couple the near-field signal 420 such that a main line between an input port and a transmitted port is coupled to the wireless power receiver 470 so that there is minimal additional loss on the wireless power path. A coupled port of the coupler 426 may be connected to the NFC transceiver 460 to provide an attenuated path (e.g., about 20 dB) for wireless communication, which may not require as much signal strength relative to wireless power reception. A load 428 may be coupled to the final port of the coupler 426 to balance with the coupled port.

Figure 8:
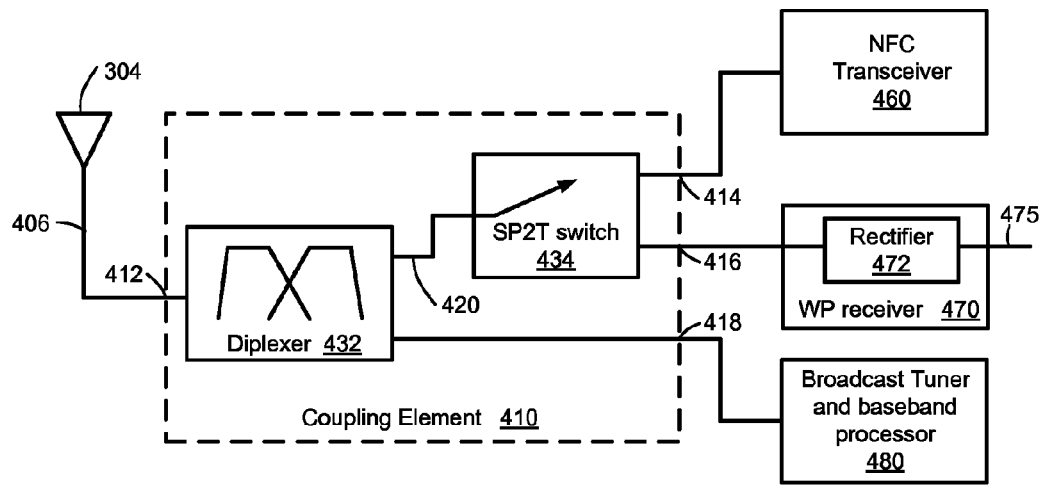
FIG. 8 is a simplified block diagram using a diplexer and a switch to share an antenna for wireless power reception, near-field communication, and reception of signals in the broadcast radiation band.

FIG. 8 is a simplified block diagram using a diplexer 432 and a switch 434 to share an antenna 304 for wireless power reception, near-field communication, and reception of signals in the broadcast radiation band. The elements of the antenna 304, the RF signal 406, the NFC transceiver 460, the wireless power receiver 470, the DC signal 475, and the broadcast receiver 480 are the same as those of FIG. 6 and need not be described again.

In FIG. 8, the coupling element 410 includes the diplexer 432 coupling the RF signal 412 to the third port 418 and a near-field signal 420. A single-pole-two-throw switch 434 selectively couples the near-field signal 420 to either the first port 414 or the second port 416.

The diplexer combines or splits the two different frequencies of the near-field radiation band on the near-field signal 420 and the broadcast radiation band on the third port 418 to or from the single RF signal 406.

In this embodiment, the higher frequency FM radiation band received on the antenna 304 may be split out and isolated by the diplexer to connect to an FM tuner. Alternatively, the lower frequency AM radiation band received on the antenna 304 may be split out and isolated by the diplexer to connect to an AM tuner. Similarly, the middle frequency near-field signal 420 may be split out and isolated by the diplexer to connect to the switch 434. Depending on the desired operation mode, the near-field signal 420 may be directly connected to the wireless power receiver 470 to supply wireless power or may be connected to the NFC transceiver 460 to provide near-field communication through the near-field signal 420 and the antenna 304.

Use of the diplexer 432 allows a tailored frequency response in both of the bands of interest, including pass band insertion loss and stop band rejection. Insertion loss may be minimized in either or both bands by a suitable choice of passive components, as is known to those skilled in the art. Such a diplexer 432 may, for example, include a passive low pass and high pass filter in combination. In another embodiment one or both of the filters may be a band pass filter. Regardless of the topologies chosen, the diplexer may be configured so that the presence of one filter for a given band does not adversely affect the response of the other filter in its desire band, as is well know to those skilled in the art of filter design.

The response of either of the filters in the diplexer 432 may be further tailored so as to enhance certain rejection characteristics. As an example, an FM band filter may be designed so that it has a pronounced transmission zero at 13.56 MHz, which would provide much greater rejection of a wireless power signal than could otherwise be obtained from a conventional filter topology. The same concept may be applied to any frequency that is used for wireless power, as this is not limited to 13.56 MHz.

Figure 9:
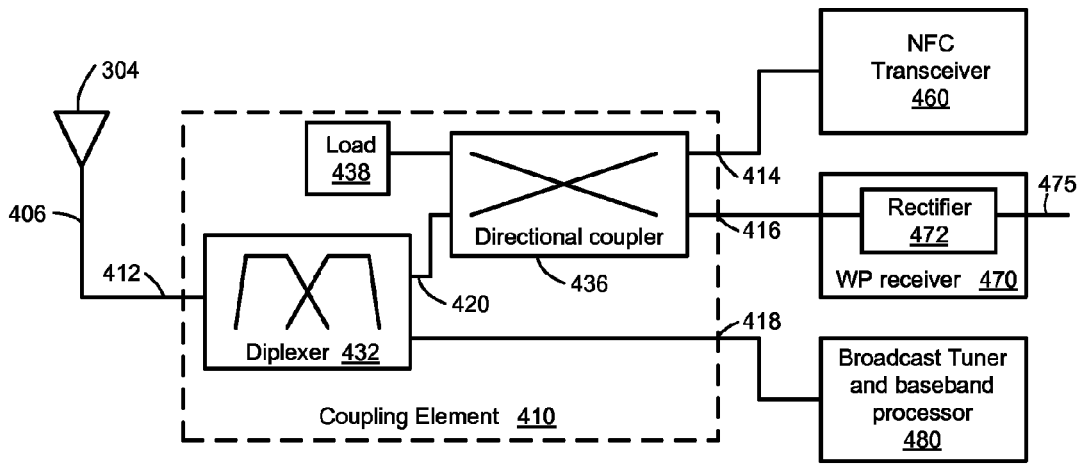
FIG. 9 is a simplified block diagram using a diplexer and a directional coupler to share an antenna for wireless power reception, near-field communication, and reception of signals in the broadcast radiation band.

FIG. 9 is a simplified block diagram using a diplexer 432 and a directional coupler 436 to share an antenna 304 for wireless power reception, near-field communication, and reception of signals in the broadcast radiation band. The elements of the antenna 304, the RF signal 406, the NFC transceiver 460, the wireless power receiver 470, the DC signal 475, and the broadcast receiver 480 are the same as those of FIG. 6 and need not be described again.

In FIG. 9, the coupling element 410 includes the diplexer 432 coupling the RF signal 412 to the third port 418 and a near-field signal 420. A coupler 436 (e.g., a directional coupler) couples the near-field signal 420 to both the first port 414 and the second port 416. Operational details of each of the coupler 436 and diplexer 432 were described above with respect to the coupler 426 of FIG. 7 and the diplexer 432 of FIG. 8.

Figure 10:
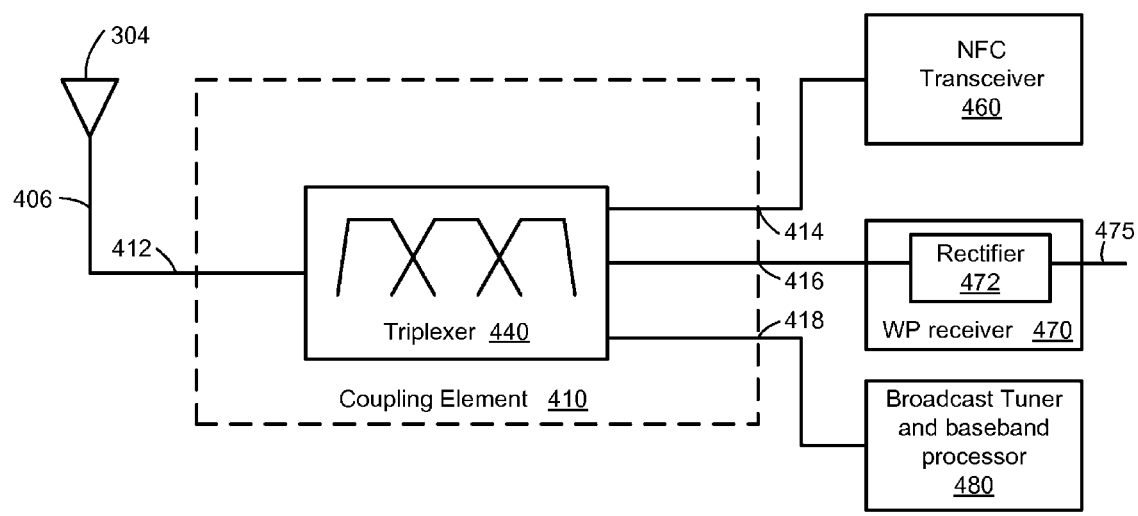
FIG. 10 is a simplified block diagram using a triplexer to share an antenna for wireless power reception, near-field communication, and reception of signals in the broadcast radiation band.

FIG. 10 is a simplified block diagram using a triplexer 440 to share an antenna 304 for wireless power reception, near-field communication, and reception of signals in the broadcast radiation band. The elements of the antenna 304, the RF signal 406, the NFC transceiver 460, the wireless power receiver 470, the DC signal 475, and the broadcast receiver 480 are the same as those of FIG. 6 and need not be described again.

In FIG. 10, the coupling element 410 includes the triplexer to simultaneously couple the RF signal 406 to each of the NFC transceiver 460, the wireless power receiver 470, and the broadcast receiver 480. The concept of a diplexer may be extended to more than two bands, that is, a multiplexer, or N-plexer may be designed, that separates the single, common input into N different frequency channels. In this example, N=3. The embodiment of FIG. 10 may be useful when different frequencies are used for near-field communication and a power transfer frequency.

In the exemplary embodiment of FIGS. 6-10, a Micro-Electro-Mechanical System (MEMS) device may be used for portions of the switching, coupling, and multiplexing of different frequencies. In addition, the MEMS device may include impedance matching networks to provide the optimum match for each different path. In an exemplary embodiment, a MEMS-based hybrid may perform the switch function and the impedance match/tuning functions. In that embodiment, one may not need an identifiable SP3T (or an SPnT) switch in the classic sense, since that function could be absorbed in the MEMS structure. In another exemplary embodiment, there may not be a separate SP3T switch and broadcast receiver block, or NFC/wireless power match.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
   an antenna for receiving electromagnetic radiation in a broadcast radiation band and a near-field radiation band to generate a Radio Frequency (RF) signal;
   a coupling element including a common port selectively coupled to a first port or a second port, the common port operably coupled to the antenna to receive the RF signal;
   a broadcast receiver operable at the broadcast radiation band and coupled to the second port;
   a wireless power receiver operable at the near-field radiation band and coupled to the first port when the coupling element couples the first port to the common port; and
   the wireless power receiver comprising a matching circuit coupled to the first port when the coupling element couples the first port to the common port.

2. The apparatus of claim 1, additionally comprising a third port and wherein the coupling element comprises a single-pole-three-throw switch for selectively coupling the common port to one of the first port, the second port, or the third port.

3. The apparatus of claim 1, additionally comprising a third port and wherein the coupling element comprises:
   a single-pole-two-throw switch for selectively coupling the common port to a near-field signal or the second port, the near-field signal corresponding to the near-field radiation band; and
   a directional coupler for coupling the near-field signal to the third port and the first port.

4. The apparatus of claim 3, wherein a main line of the directional coupler is coupled to the first port and a coupled port of the directional coupler is coupled to the third port.

5. The apparatus of claim 1, additionally comprising a third port and wherein the coupling element comprises:
   a diplexer operably coupled to the common port for combining or separating a signal corresponding to the broadcast radiation band on the second port and a near-field signal corresponding to the near-field radiation band; and
   a single-pole-two-throw switch for selectively coupling the near-field signal to the third port or the first port.

6. The apparatus of claim 1, additionally comprising a third port and wherein the coupling element comprises:
   a diplexer operably coupled to the common port for combining or separating a signal corresponding to the broadcast radiation band on the second port and a near-field signal in the near-field radiation band; and
   a directional coupler for coupling the near-field signal to the third port and the first port.

7. The apparatus of claim 1, additionally comprising a third port and wherein the coupling element comprises a triplexer operably coupled to the common port for combining or separating the broadcast radiation band on the second port, a near-field radiation signal in the near-field radiation band on the third port and a wireless power signal in the near-field radiation band on the first port.

8. The apparatus of claim 1, wherein the broadcast radiation band comprises an FM radiation band with radiation in frequencies of about 88 to 108 MHz or an AM radiation band with radiation in frequencies of about 540 to 1600 KHz and the near-field radiation band comprises radiation in a frequency band centered around about 13.56 MHz.

9. The apparatus of claim 1, additionally comprising a third port and further comprising:
   a Near-Field Communication (NFC) transceiver operably coupled to the third port and comprising circuitry for communicating information on the antenna in the near-field radiation band when the coupling element couples the third port to the common port; and the broadcast receiver operably coupled to the second port and comprising circuitry for receiving and tuning the broadcast radiation band from the RF signal when the coupling element couples the second port to the common port.

10. The apparatus of claim 9, wherein:

the NFC transceiver provides a broad bandwidth in the near-field radiation band to optimize NFC communications.

11. A method, comprising:

with an antenna, receiving electromagnetic radiation in a broadcast radiation band and a near-field radiation band to generate a Radio Frequency (RF) signal;

selectively coupling a common port to a first port or a second port, the common port operably coupled to the antenna to receive the RF signal;

operating a wireless power receiver at the near-field radiation band when the first port is coupled to the common port, the wireless power receiver configured to provide an impedance match; and receiving a signal at the broadcast radiation band when the second port is coupled to the common port.

12. The method of claim 11, additionally comprising a third port and wherein the selectively coupling comprises selectively coupling common port to one of the first port, the second port, or the third port.

13. The method of claim 11, additionally comprising a third port and wherein the selectively coupling comprises:

selectively coupling the common port to a near-field signal or the second port; and directionally coupling the near-field signal to the third port and the first port.

14. The method of claim 11, additionally comprising a third port and wherein the selectively coupling comprises:

diplexing to combine or separate a signal corresponding to the broadcast radiation band on the second port and a near-field signal corresponding to the near-field radiation band; and selectively coupling the near-field signal to the third port or the first port.

15. The method of claim 11, additionally comprising a third port and wherein the selectively coupling comprises:

diplexing to combine or separate a signal corresponding to the broadcast radiation band on the second port and a near-field signal corresponding to the near-field radiation band; and directionally coupling the near-field signal to the third port and the first port.

16. The method of claim 15, wherein directionally coupling comprises coupling the near-field signal to the first port on a main line of a directional coupler and coupling the near-field signal to the third port on a coupled port of the directional coupler.

17. The method of claim 11, additionally comprising a third port and wherein the selectively coupling comprises triplexing to combine or separate a signal corresponding to the broadcast radiation band on the second port, a near-field radiation signal in the near-field radiation band on the third port and a wireless power signal in the near-field radiation band on the first port.

18. The method of claim 11, wherein the broadcast radiation band comprises an FM radiation band with radiation in frequencies of about 88 to 108 MHz or an AM radiation band with radiation in frequencies of about 540 to 1600 KHz and the near-field radiation band comprises radiation in a frequency band centered around about 13.56 MHz.

19. The method of claim 11, additionally comprising a third port and the method further comprising:

transmitting, receiving, or a combination thereof, information on the antenna in the near-field radiation band when the third port is coupled to the common port; and receiving a signal corresponding to the broadcast radiation band when the second port is coupled to the common port.

20. The method of claim 19, additionally comprising converting a near-field radiation signal in the near-field radiation band to a DC signal; and wherein the transmitting, receiving, or a combination thereof, information on the antenna further comprises providing a broad bandwidth in the near-field radiation band to optimize NFC communications.

21. A wireless power receiver, comprising:

an antenna for receiving electromagnetic radiation in a broadcast radiation band and a near-field radiation band to generate a Radio Frequency (RF) signal;

means for selectively coupling a common port to a first port or a second port, the common port operably coupled to the antenna to receive the RF signal;

means for receiving the near-field radiation band when the first port is coupled to the common port, the means for receiving the near-field radiation band configured to provide an impedance match; and means for receiving the broadcast radiation band when the second port is coupled to the common port.

22. The wireless power receiver of claim 21, additionally comprising a third port and wherein the means for selectively coupling comprises means for selectively coupling the common port to one of the first port, the second port, or the third port.

23. The wireless power receiver of claim 21, additionally comprising a third port and wherein the means for selectively coupling comprises:

means for selectively coupling the common port to a near-field signal or the second port; and means for directionally coupling the near-field signal to the third port and the first port.

24. The wireless power receiver of claim 21, additionally comprising a third port and wherein the means for selectively coupling comprises:

means for diplexing to combine or separate a signal corresponding to the broadcast radiation band on the second port and a near-field signal corresponding to the near-field radiation band; and means for selectively coupling the near-field signal to the third port or the first port.

25. The wireless power receiver of claim 21, additionally comprising a third port and wherein the means for selectively coupling comprises:

means for diplexing to combine or separate a signal corresponding to the broadcast radiation band on the second port and a near-field signal corresponding to the near-field radiation band; and means for directionally coupling the near-field signal to the third port and the first port.

26. The wireless power receiver of claim 25, wherein the means for directionally coupling comprises a main line means for coupling the near-field signal to the first port and a coupled port means for coupling the near-field signal to the third port.

27. The wireless power receiver of claim 21, additionally comprising a third port and wherein the means for selectively coupling comprises means for triplexing to combine or separate a signal corresponding to the broadcast radiation band on the second port, a near-field radiation signal in the near-field radiation band on the third port and a wireless power signal in the near-field radiation band on the first port.

28. The wireless power receiver of claim 21, wherein the broadcast radiation band comprises an FM radiation band with radiation in frequencies of about 88 to 108 MHz or an AM radiation band with radiation in frequencies of about 540 to 1600 KHz and the near-field radiation band comprises radiation in a frequency band centered around about 13.56 MHz.

29. The wireless power receiver of claim 21, additionally comprising a third port and further comprising:
means for transmitting, receiving, or a combination thereof, information on the antenna when the third port is coupled to the common port; and
means for receiving a signal corresponding to the broadcast radiation band when the second port is coupled to the common port.

30. The wireless power receiver of claim 29, additionally comprising
means for converting a near-field radiation signal in the near-field radiation band to a DC signal; and
wherein the means for transmitting, receiving, or a combination thereof, information on the antenna further comprises means for providing a broad bandwidth in the near-field radiation band to optimize NFC communications.

31. A method of sharing a signal, the method comprising:
receiving a Radio Frequency (RF) signal at a receiving coil;
selectively connecting a common port of a coupling circuit to either a first port connected to a data receiver or to a second port connected to a wireless power receiver;
converting at least one radiation band of the RF signal to a direct current signal;
providing an impedance match at an operational frequency in the at least one radiation band; and
outputting the direct current signal to power or charge an electronic device.

32. The method of claim 31, wherein selectively connecting the common port of the coupling circuit comprises activating a throw switch.

33. The method of claim 31, additionally comprising receiving the RF signal via a third port connected to a second data receiver, and wherein selectively connecting the common port further comprises selectively connecting the receiving coil to at least one of the first, second or third ports.

34. The method of claim 33, wherein selectively connecting the common port comprises controlling a switch and a directional coupler so as to connect the receiving coil to at least one of the first, second or third ports.

35. The method of claim 33, wherein selectively connecting the common port comprises controlling a switch and a diplexer to connect the receiving coil to at least one of the first, second or third ports.

36. A method of sharing a coil, the method comprising:
wirelessly receiving a signal at a coil;
converting the signal via a power receiver to a direct current signal to power or charge an electronic device;
providing an impedance match via the power receiver;
receiving the signal via a communications receiver; and
selectively coupling the coil to one of the power receiver or the communications receiver.

37. The method of claim 36, additionally comprising receiving the signal via a second communications receiver, and wherein selectively coupling further comprises selectively coupling the coil to at least one of the communications receiver, the power receiver, or the second communications receiver.

38. The method of claim 36, wherein the communications receiver comprises a near-field radiation communications transceiver.

* * * * *